Figure 1:
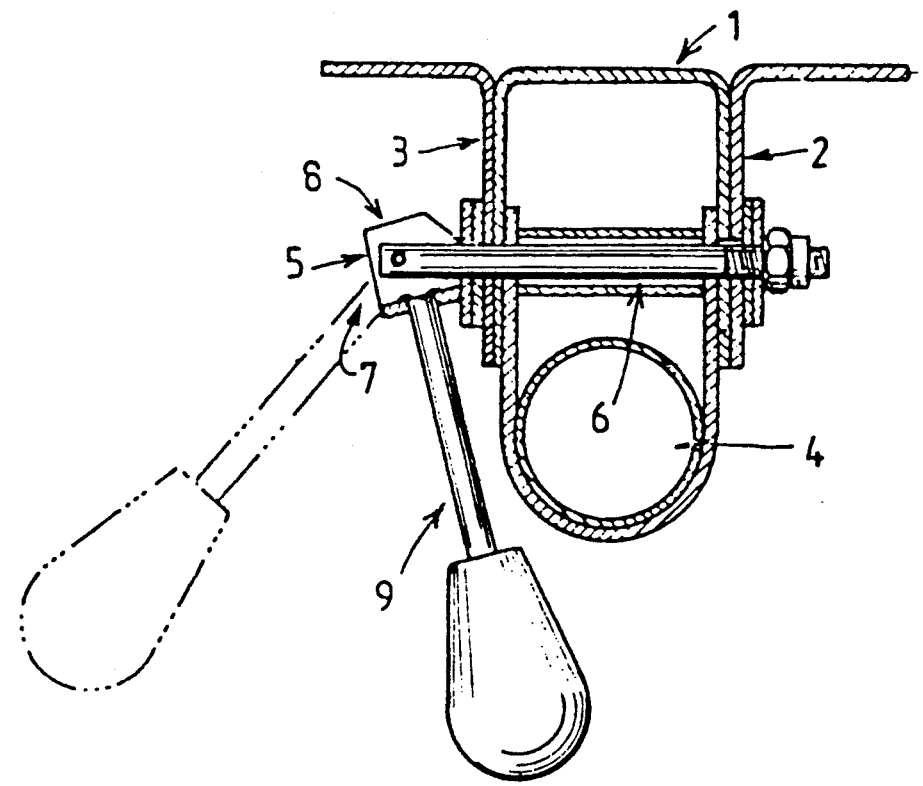

United States Patent [19]

Hoblingre

[11] Patent Number: 5,160,165
[45] Date of Patent: Nov. 3, 1992

[54] DEVICE FOR FIXING IN POSITION AN ADJUSTABLE STEERING COLUMN OF AN AUTOMOBILE VEHICLE

[75] Inventor: André Hoblingre, Valentigney, France

[73] Assignee: ECIA, France

[21] Appl. No.: 789,679

[22] Filed: Nov. 8, 1991

[30] Foreign Application Priority Data

Nov. 9, 1990 [FR] France .................. 90 13929

[51] Int. Cl.⁵ .......................................... B62D 1/18
[52] U.S. Cl. ................................ 280/775; 74/493; 411/344; 403/408.1
[58] Field of Search ............... 280/775; 74/493; 411/340, 341, 344, 348; 403/408.1, 388

[56] References Cited

U.S. PATENT DOCUMENTS

| | | | |
|---|---|---|---|
| 4,400,038 | 8/1983 | Hosokawa | 280/288 X |
| 4,648,624 | 3/1987 | Mouhot et al. | 74/493 X |
| 5,088,767 | 2/1992 | Hoblingre et al. | 280/775 |
| 5,117,707 | 6/1992 | Kinoshita et al. | 280/775 |

FOREIGN PATENT DOCUMENTS 242928 10/1987 European Pat. Off. .
411312 2/1991 European Pat. Off. .
2558985 7/1976 Fed. Rep. of Germany .
2360454 3/1978 France .

Primary Examiner—Charles A. Marmor
Assistant Examiner—Tamara L. Graysay
Attorney, Agent, or Firm—Sughrue Mion Zinn Macpeak & Seas

[57] ABSTRACT

The fixing device comprises a steering column support structure for connection to the rest of the structure of the vehicle and comprising two side members (2,3) between which the steering column (4) is disposed, and means for fixing the column in position by urging the side members towards each other and comprising a rod (10) extending between the side members and having a first end portion (11) bearing against one of the side members and a second end portion connected to eccentric fixing means (12) comprising at least one eccentric cam (13,17) connected to an actuating lever (14) and to the second end portion (15) of the rod (10) and bearing against the other side member of the structure to permit urging the side members towards each other and thereby fixing the column in position. At least one rolling member (18,19) is interposed between the at least one eccentric cam and the corresponding side member of the support structure.

12 Claims, 2 Drawing Sheets

DEVICE FOR FIXING IN POSITION AN ADJUSTABLE STEERING COLUMN OF AN AUTOMOBILE VEHICLE

The present invention relates to a device for fixing in position an adjustable steering column of an automobile vehicle.

More particularly, the invention relates to such a fixing device of the type comprising a column support structure connected to the rest of the structure of the vehicle and comprising two side members between which the column is disposed, and means for fixing in position the column by urging the side members towards each other, said fixing means comprising a rod extending between the side members and having a first end portion bearing against one of the side members and a second end portion connected to eccentric fixing means comprising at least one eccentric cam connected to a shifting lever and to the second end portion of the rod and bearing against the other side member of the support structure to permit urging the side members towards each other and thereby fixing the column in position.

Such a structure is well known in the art and is disclosed for example in the document FR-A-2,360,454, more particularly with reference to FIGS. 1 and 4 of this document.

However, all the eccentric fixing means known in the art have a number of drawbacks in that they are relatively difficult to actuate.

Indeed, the eccentric cams of these fixing means bear directly against a corresponding surface of one of the side members of the support structure to permit the side members to be urged towards each other and fix the column in position. It will be understood that the greater the clamping force required, the greater is the difficulty in actuating and shifting this eccentric cam.

An object of the invention is therefore to overcome these problems by providing a device for fixing in position an adjustable steering column of an automobile vehicle which is simple, reliable and easily actuated.

The invention therefore provides a fixing device of the type described hereinbefore, characterized in that at least one rolling member is interposed between said at least one eccentric cam and the corresponding side member of the support structure.

The rolling member may be formed for example by a ball disposed in a corresponding cavity in one of two elements namely the side member or cam and adapted to cooperate with the other of said two elements, namely the cam or side member, to facilitate the relative displacement between these elements.

Figure 2:
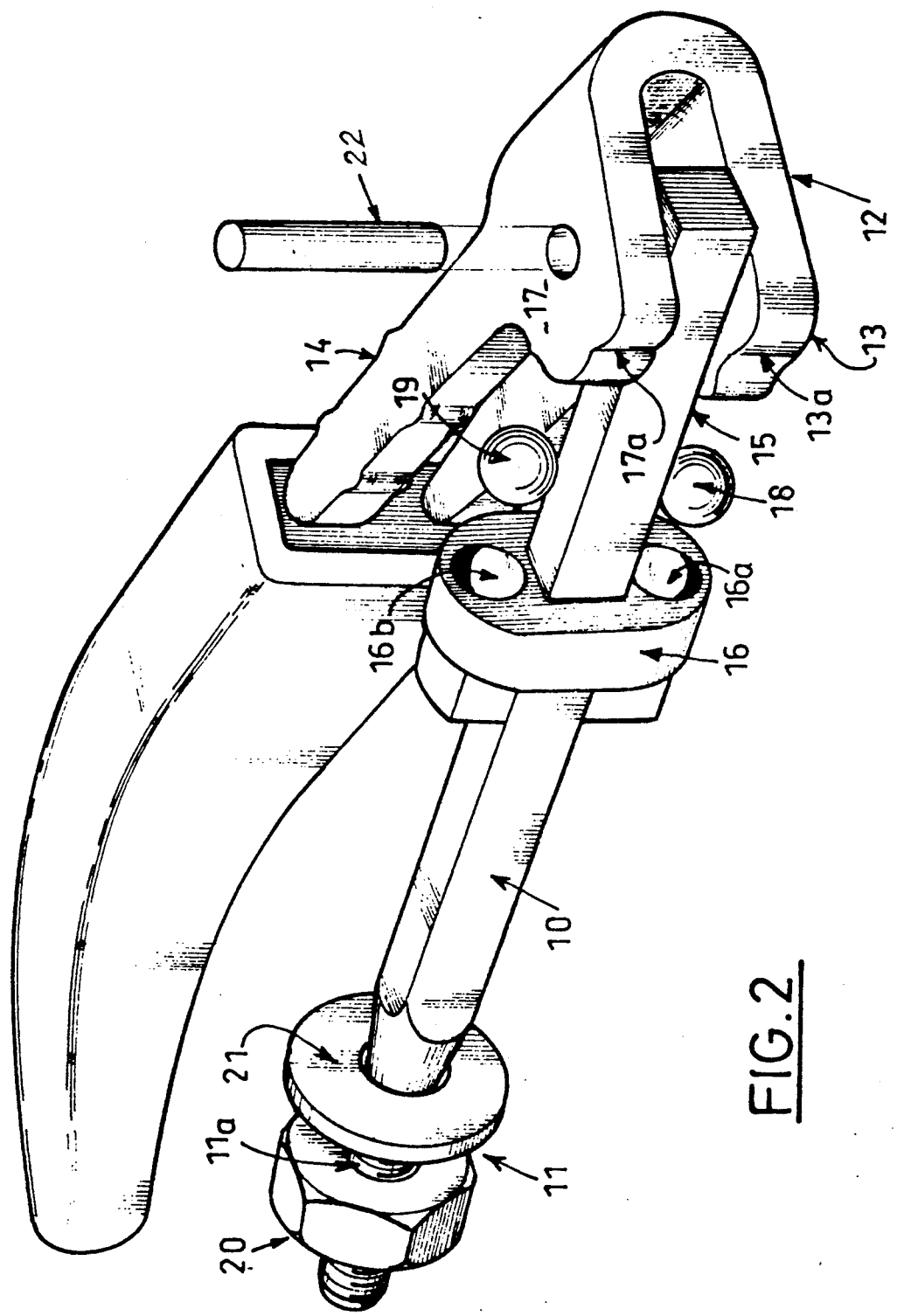

A better understanding of the invention will be had from the following description which is given solely by way of example with reference to the accompanying drawings in which:

FIG. 1 is a sectional view of a device known in the art for fixing in position an adjustable steering column of an automobile vehicle; and FIG. 2 is an exploded perspective view of the eccentric fixing means forming part of a fixing device according to the invention.

As can be seen in FIG. 1, a known device for fixing in position an adjustable steering column of an automobile vehicle comprises mainly a column support structure generally designated by the reference character 1 in FIG. 1 and connected to the rest of the structure of the vehicle and comprising two side members 2 and 3 between which the steering column 4 is disposed. This fixing device further comprises means 5 for fixing the column in position by urging the side members towards each other, said fixing means comprising a rod 6 extending between the side members and having a first end portion bearing against one of the side members and a second end portion connected to eccentric fixing means 7 comprising at least one eccentric cam 8 connected to an actuating lever 9 and to the second end portion of the rod 6 and bearing against the other side member of the structure so as to permit urging the side members towards each other and thereby fixing the column in position.

A more detailed description of this known type of fixing device may be had from the aforementioned French document.

As mentioned before, these known devices have a number of drawbacks as concerns the actuation of the eccentric cam.

An object of the invention is to overcome these problems by providing a device shown in FIG. 2. It will first of all be mentioned that the device for fixing in position the steering column of an automobile vehicle according to the invention is a device partly similar to that described with reference to FIG. 1, in that it also comprises a column support structure connected to the rest of the structure of the vehicle and comprising two side members between which the column is disposed.

The fixing device according to the invention also comprises means for fixing the column in position by urging the side members towards each other, these fixing means comprising for example a rod 10 extending between said side members and having a first end portion 11 which bears against one of the side members, or a first side member, and a second end portion connected to eccentric fixing means 12 comprising at least one eccentric cam 13 connected to an actuating lever 14 and to the second end portion 15 of the rod and bearing against the other side member of the support structure, or second side member, to permit urging these side members towards each other and thereby fixing the column in position. As illustrated, an intermediate bearing element 16 may be interposed between the or each eccentric cam of the fixing means and said other side member of the support structure.

In the embodiment shown in FIG. 2, the fixing means comprise two eccentric cams 13 and 17 symmetrically arranged on each side of the rod 10 and more particularly of the second end portion 15 of the latter. Rolling members 18 and 19, for example formed by balls, are interposed between said cams and the intermediate bearing element 16. In the presently-described embodiment, the balls are disposed in corresponding cavities 16a and 16b of the intermediate bearing element 16, these cavities being provided on each side of the rod 10 in facing relation to the cams.

It will be understood that the cams may be moved relative to the rest of the structure of the fixing means and in particular to the intermediate bearing element 16, more easily than in the devices known in the art in that these rolling members facilitate the relative displacement in translation and in rotation of the various component parts of said fixing means.

Note also that the cams 13 and 17 and the end portion 15 of the rod each include an aperture for the passage of a connecting pin 22 extending through the cams and the corresponding end portion of the rod so as to interconnect these different component parts.

Although in the embodiment shown in FIG. 2 the fixing means of the fixing device according to the invention comprise two cams located on each side of the corresponding end portion of the rod, it will be understood that these means may comprise only a single cam.

Note also that the cams 13 and 17 may in fact be formed by branches of a fork disposed around the end portion 15 of the rod, this fork being in one piece with the actuating lever 14.

Further, the cams 13 and 17 each define a recess 13a and 17a for receiving the respective ball and defining a fixing position. Indeed, when the lever is shifted to the position for fixing the steering column in position, the cams 13 and 17 bear against and move along said rolling members so as to urge the side members towards each other. When the rolling balls enter the recesses 13a and 17a of the cams, the user notices a discontinuity in the effort required indicating that the lever and the fixing means are in a stable column fixing position.

Although in the illustrated embodiment the balls are disposed in the cavities 16a and 16b of the bearing element 16, it will be understood that they may also be disposed in cavities provided in the region of the surface of the cams adapted to cooperate with this intermediate bearing element and that the latter may also include recesses for receiving the balls in the fixing position so as to bring about a discontinuity in the effort required indicating to the user that the lever and the fixing means are in the stable fixing position.

A plurality of balls disposed side by side may also be provided.

Note that the first end portion 11 of the rod 10 includes a screwthreaded portion 11a on which an associated nut 20 is mounted, for example including a washer 21 for bearing against the corresponding side member of the support structure in a way similar to that shown in FIG. 1, this nut permitting the adjustment of the effort exerted on the side members for fixing the column in position.

What is claimed is:

1. Device for fixing in position an adjustable steering column of an automobile vehicle, relative to a steering column support structure which is connected to a structure of said vehicle and comprises two side members between which side members said steering column is disposed, said device comprising means for fixing in position said column by urging said side members towards each other, said fixing means comprising a rod extending between said side members and having a first end portion for bearing against a first side member of said side members and a second end portion, eccentric fixing means connected to said second end portion and comprising at least one eccentric cam, an actuating lever, said at least one eccentric cam being connected to said actuating lever and to said second end portion of said rod, and for bearing against a second side member of said side members of said structure for urging said side members towards each other and thereby fixing the column in position, and a rolling member for interposition between said at least one eccentric cam and said second side member of said support structure.

2. Device according to claim 1, further comprising an intermediate bearing member for interposition between said at least one cam and said second side member of said support structure.

3. Device according to claim 2, wherein said rolling member is interposed between said at least one cam and said intermediate bearing member.

4. Device according to claim 3, wherein said eccentric fixing means comprise two eccentric cams disposed on opposite sides of said second end portion of said rod, and two rolling members respectively cooperative with said two cams.

5. Device according to claim 2, wherein said rolling member is disposed in a corresponding cavity provided in one of three elements consisting of said second side member, said intermediate bearing member and said cam and is cooperative with another element of said three elements to facilitate the relative displacement of said elements.

6. Device according to claim 5, wherein said eccentric fixing means comprise two eccentric cams disposed on opposite sides of said second end portion of said rod, and two rolling members respectively cooperative with said two cams, two cavities being provided in said intermediate bearing member for respectively receiving said two rolling members.

7. Device according to claim 5, wherein said cavity is provided in said intermediate bearing member for receiving said rolling member.

8. Device according to claim 7, wherein said at least one cam defines a recess for receiving said at least one rolling member and defining a stable column fixing position.

9. Device according to claim 5, wherein said cavity is provided in said at least one cam.

10. Device according to claim 9, wherein said intermediate bearing member comprises a recess for receiving said rolling member and defining a stable column fixing position.

11. Device according to claim 1, wherein said rolling member is a ball.

12. Device according to claim 1, wherein said second end portion of said rod is a screwthreaded portion and a nut is screwthreadedly engaged on said screwthreaded portion for bearing against said first side member.

* * * * *